United States Patent [19]
Cook et al.

[11] Patent Number: 5,271,516
[45] Date of Patent: Dec. 21, 1993

[54] ISOLATION STRUCTURE FOR CONTAMINATION SENSITIVE ITEMS

[75] Inventors: Lawrence G. Cook, Indianapolis, Ind.; Robert F. Florence, Jr., Poughkeepsie, N.Y.; Gary M. Gallagher, Wappingers Falls, N.Y.; Gordon E. Johnson, Redding, Conn.; Robert W. Sargent, LaGrangeville, N.Y.

[73] Assignee: International Business Machines Corporation, Armonk, N.Y.

[21] Appl. No.: 950,110

[22] Filed: Sep. 24, 1992

[51] Int. Cl.$^5$ .............................. F16L 55/00
[52] U.S. Cl. ................................ 220/232
[58] Field of Search .............. 220/4.01, 232, 339; 414/292

[56] References Cited

U.S. PATENT DOCUMENTS

| | | | |
|---|---|---|---|
| 2,530,160 | 11/1950 | Finley | 220/232 X |
| 3,223,276 | 12/1965 | Gebhardt et al. | 220/232 |
| 3,325,042 | 6/1967 | Brown | 220/232 |
| 3,371,986 | 3/1968 | Brown | 220/232 X |
| 3,500,584 | 3/1970 | Clery et al. | 220/232 X |
| 4,335,075 | 6/1982 | Kackos | 220/232 X |
| 4,482,076 | 11/1984 | Wentzell | 220/232 |
| 4,532,970 | 8/1985 | Tullis et al. | 141/98 |
| 4,724,874 | 2/1988 | Parikh et al. | 141/98 |

Primary Examiner—Steven M. Pollard
Attorney, Agent, or Firm—Harold Huberfeld

[57] ABSTRACT

A reusable isolation structure features an easily cleanable shell having viewing windows formed therein, each protected by a framing ridge or a recess integrally formed in the shell provides protection of contents from contamination, impact, vibration and tampering. Framing ridges or recesses also facilitate stacking of shells. The closure member opening of the shell includes a groove formed around the periphery thereof and is preferably not more than slightly smaller than an interior cross-section of the shell. A door of the isolation structure is dimensioned to fit within the closure member opening and has a resilient seal clamped to the periphery of a backbone by front and rear plates. The front and rear plates cooperate with grooves formed in the backbone to define a preferred form of manifold for coupling pressure or a vacuum to the interior of the resilient seal whereby the resilient seal may be collapsed to allow removal of the door or allowed to expand or pressurized to provide secure closure. Filters and vapor and moisture drains are carried by the door structure. The door also provides a smooth interior surface of the isolation structure of closely controlled and accurately repeatable dimensions. A vacuum plate for handling the door simultaneously provides for evacuation and controlled collapse of the resilient seal as well as containment of contamination of the exterior thereof.

20 Claims, 4 Drawing Sheets

ISOLATION STRUCTURE FOR CONTAMINATION SENSITIVE ITEMS

BACKGROUND OF THE INVENTION

1. Field of the Invention

The present invention generally relates to enclosures for the packaging of items and, more particularly, to packaging structures for isolating contamination sensitive items such as electronic components.

2. Description of the Prior Art

For many years, packaging has been an integral part of the transportation and delivery of products to users. One principal function of packaging for these purposes has been to provide ease of handling and space efficient storage of the product, prior to use. This may include packaging features which facilitate display of the product by dealers or information which is helpful in the selection and use of the product.

A further and often more important function of such packaging is the protection of the product from the time of production or manufacture until the time of use. Such protection has become particularly critical for electronic circuit components which are often subject to damage from a wide range of environmental conditions. Such conditions include, but are not limited to, accelerations during handling, such as impacts against surfaces, vibration, static electricity and contamination by vapors and particles and tampering.

To protect such devices, numerous containers have been designed and used in the past. Insertion of the pins of integrated circuit devices into a conductive foam which is supported by the package has been used to protect against static electricity and, to some extent, accelerations and vibration. However, this feature of some packaging does nothing to protect against contamination or tampering (e.g. removal and replacement of the device in the protective foam under conditions where damage could occur).

Other package features directed to prevention of contamination and tampering have included so-called bubble wraps where the device is placed in a recess formed in a plastic sheet and the recess sealed with cardboard, foil or the like. While such sealing of the recesses provides some protection against contamination and tampering (since the packaging cannot be opened without producing visible evidence thereof) provision of protection against vibration and impact accelerations is difficult since the item is usually only loosely enclosed within the packaging. Further, control of the atmosphere during and after packaging is difficult, especially since most plastics exhibit outgassing of vapors after manufacture or other processing. The bubble wrap form of packaging is also somewhat fragile and may easily sustain damage which would allow contamination by external ambient gases and particles without such damage being evident.

A variation of the bubble wrap form of packaging has been the so-called shrink wrap package. This type of package is formed by applying a vacuum through a backing sheet, usually of cardboard, to deform a plastic membrane around the item. This form of packaging is perhaps even more tamper resistant than bubble wrap packaging and offers some improvement of protection against vibration and impacts since the item is held tightly against the backing material. Some contamination resistance can be provided by sealing the backing sheet. However, since the plastic is formed tightly over the device, there can be no assurance that the plastic sheet will remain entirely intact during the packaging process. Further, the shrink wrap form of packaging has had little application to sensitive electronics products since the thermal and mechanical stresses, both from the deformation of the plastic sheet and the vacuum applied, can damage the product packaged. The product may also be damaged during removal from the packaging or may be affected by bits of the plastic film adhering to the product.

The above forms of packaging, therefore, do not simultaneously provide protection from even the most major environmental factors which could damage delicate electronic circuit components. While the above-discussed packaging techniques are relatively inexpensive and are only used a single time, they cannot provide the combination of features required for protection of such electronics components.

More expensive, reusable packaging, however, is usually of a more robust construction and is therefore less likely to be resistant to tampering or to show physical evidence that tampering has occurred. Moreover, the possibility of reuse introduces further problems of cleaning of the packaging between uses. Further, multiple uses implies the possibility of damage or wear which would shorten the usable lifetime of the container and increase expense. Such damage or wear rendering a container or a part thereof unsuitable for further use may not be evident from simple inspection.

The provision of single-use seals in combination with multiple-use containers also does not provide a complete solution to current packaging requirements. Such seals represent an added expense and often do not provide a smooth interior of the container, which can also be a source of damage to electronic devices contained therein. Additionally, single use seals may also represent a source of contamination during opening of the container and, when placed in compression, do not result in closely controllable interior and/or exterior dimensions of the package.

Further, none of the above packaging techniques provides for maintaining clean conditions during removal of the product from the package when the exterior surface of the package may have become contaminated. This requirement has become more important during recent years with the increase of storage and transportation of intermediate products for electronic devices which must be maintained in a clean condition when removed from the packaging for further processing. Further, the maintenance of an adequately clean manufacturing environment has led to increased manipulation of the packaging and items contained therein by automated processing equipment. Therefore, isolation structures must be adapted to be manipulated by such equipment in addition to providing the required types of protection for the packaged items. This adaptation often requires both the packaging and the automated equipment to be specially modified and standardized, increasing costs and reducing the generality of application of the automated equipment.

SUMMARY OF THE INVENTION

It is therefore an object of the present invention to provide an isolation structure which will simultaneously provide for protection of an item contained therein from contamination by particles or vapors generated either internally or externally of the isolation structure as well as protection from impacts, vibration, static electricity and tampering.

It is another object of the present invention to provide an isolation structure which is reusable and easily cleanable and the parts of which have a reduced susceptibility to damage and wear.

It is a further object of the invention to provide an isolation structure which seals the contents of the structure from the external environment, but which does not alter the internal or external dimensions of the isolation structure and provides a smooth interior surface thereof.

It is yet another object of the invention to provide an isolation structure which allows visual inspection of the contents while maintaining isolation of the contents from the external environment.

It is another further object of the invention to provide an isolation structure which can be readily handled by automated equipment without specific adaptation thereof to accommodate the particular geometry of the isolation structure.

In order to accomplish these and other objects of the invention, an isolation structure is provided including a shell, having a closure member opening, and a closure member, dimensioned to be received within the closure member opening, including a closure member body having an outer periphery and a resilient seal member on the outer periphery of the closure member body defining at least a portion of an interior space within the resilient seal member and forming at least a portion of an outer surface of said closure member, and means for communicating pressure or a partial vacuum from the outer surface of the closure member to the interior space within the resilient seal member.

In accordance with another aspect of the invention, a closure member is provided including a closure member body having an outer periphery and a resilient seal member on the outer periphery of the closure member body defining at least a portion of an interior space within the resilient seal member and forming at least a portion of an outer surface of the closure member, and means for communicating pressure or a partial vacuum from the outer surface of the closure member to the interior space within the resilient seal member.

Further, in accordance with this invention, an isolation structure includes a shell having an opening and a closure member dimensioned to be received within the opening, the closure member including a closure member body having an outer periphery and a resilient seal on the outer periphery of the closure member body, the resilient seal defining at least a portion of an interior space within the resilient seal and forming at least a portion of an outer surface of the door, and means for communicating pneumatic pressure from the outer surface of the closure member to the interior space within the resilient seal.

Preferably means are provided for attaching the resilient seal to the closure member body; and the closure member body includes a backbone and the means for attaching the resilient seal to the backbone includes front and rear plates. Preferably, the front plate provide a smooth outer surface of the closure member. Preferably, the front plate has at least one aperture formed therein.

Preferably, the means for communicating pressure or a partial vacuum from the outer surface of the closure member to the interior space within the resilient seal comprises manifold means at least partially enclosed within the closure member body; and preferably, a portion of the manifold means is formed by grooves located on a surface of the backbone.

Alternatively it is preferred that the means for communicating pressure or a partial vacuum from the outer surface of the closure member to the interior space within the resilient seal comprises manifold means at least partially enclosed within the closure member body and a portion of the manifold means is formed by grooves located on a surface of the backbone and the front plate, including the at least one aperture.

It is also preferred that means is provided for locating at least one of the front plate and the back plate relative to the backbone; wherein, preferably the means for locating at least one of the front plate and the back plate relative to the backbone includes locating pins.

Preferably means is provided for locating at least one of the front plate and the back plate relative to the backbone includes an O-ring; and preferably further includes a breather body. Preferably a groove is formed along an inner surface of the opening in the shell, and preferably, the groove further includes a preload ridge; the shell is formed of at least two portions; the shell has at least one viewing window formed therein, or at least one the portion of the shell has at least one viewing window formed therein.

In accordance with another aspect of this invention, a closure member for an isolation structure including a closure member body having an outer periphery and a resilient seal on the outer periphery of the closure member body, the resilient seal defining at least a portion of an interior space within the resilient seal and forming at least a portion of an outer surface of the closure member, and means for communicating pressure or a partial vacuum from the outer surface of the closure member to the interior space within the resilient seal. Preferably means are provided for attaching the resilient seal to the closure member body. Preferably, the closure member body includes a backbone and the means for attaching the resilient seal to the closure member body includes front and rear plates. Preferably, the front plate provides a smooth outer surface of the closure member. Preferably the front plate has at least one aperture formed the rein; and preferably the means for communicating pressure or a partial vacuum from the outer surface of the closure member to the interior space within the resilient seal comprises manifold means at least partially enclosed within the closure member body; and preferably a portion of the manifold means is formed by grooves located on a surface of the backbone; and preferably the means for communicating pressure or a partial vacuum from the outer surface of the closure member to the interior space within the resilient seal comprises manifold means at least partially enclosed within the closure member body and a portion of the manifold means is formed by grooves located on a surface of the backbone and the front plate, including the at least one aperture.

Alternatively, means are provided for locating at least one of the front plate and the back plate relative to the backbone, and preferably, the means for locating at least one of the front plate and the back plate relative to the backbone includes locating pins; preferably include an O-ring, or a breather body.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
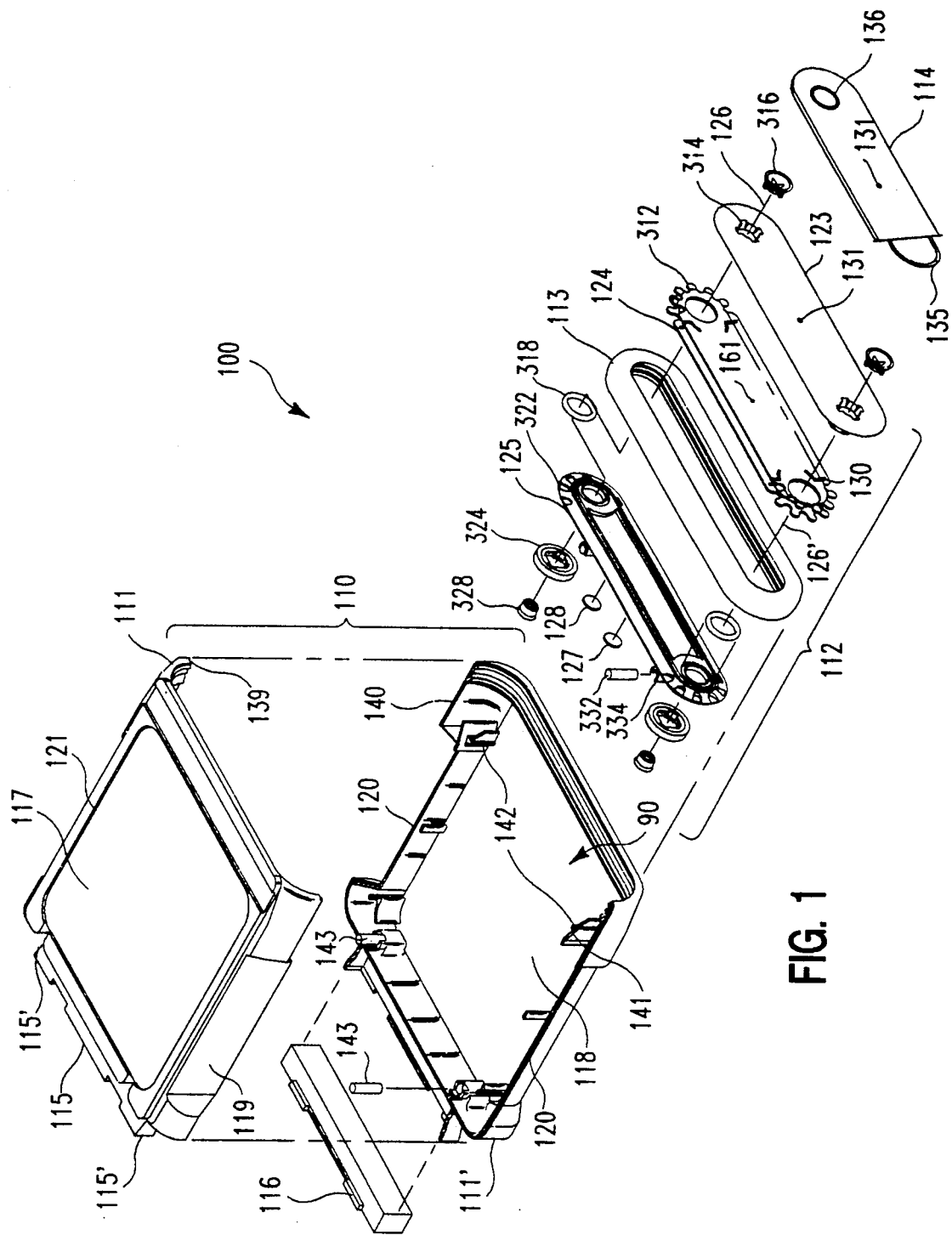
FIG. 1 is an exploded view of the isolation structure in accordance with the invention.

Referring now to the drawings, and more particularly to FIG. 1, there are shown, in an exploded view, the constituent components of the isolation structure 100 in accordance with the invention. The isolation structure 100 has two major parts, a shell 110 and a removable closure member or door 112. Shell 110 can preferably be fabricated from two shell portions 111, 111' by casting, injection molding, machining, or any other suitable technique. If the shell 110 is so formed, the portions are preferably permanently joined by hot platen welding to provide a hermetic seal member with no flash at the joint. However, other joining techniques and materials may be used such as adhesives as long as care is taken to avoid materials and formations which could form a source of loose particles or vapors (e.g. a solvent in an adhesive) which could be a source of contaminants. In any case, shell 110 portions 111, 111' are preferably formed with interlocking edge structures 139, 140 and possibly interlocking tabs such as 141 to enhance structural integrity of the shell 110 when the shell 110 portions are joined. Whatever technique or materials are utilized to join the shell portions 111, 111', it is preferable that the full extent of such locating or interfitting structures be involved (e.g. a full depth weld) so that no internal crevices will remain after the shell portions 111, 111" are joined.

The shell 110, when completed, has no moving parts or internal concave structures and thus may be easily cleaned. The major portion of the interior is preferably planar to facilitate cleaning and the closure member opening 90 into which the closure member 112 is to be fit is no smaller than the internal cross-sectional shape of the shell 110 interior, allowing brushes, nozzles or other devices to be brought into contact with all interior surfaces of the shell 110.

The planar major surfaces, such as 118, of the interior of the shell 110 also preferably cooperate with planar outer surfaces 117 to form viewing windows so that the contents of the isolation structure 100 may be inspected while maintaining isolation from the ambient atmosphere. For this reason, transparent materials are also preferred. Additionally, further viewing windows may be provided in the sides of the shell 110 such as at 119. It is preferable, if the shell 110 is formed in two portions, to avoid having a joint between such portions crossing the side viewing windows. Therefore, window 119 is preferably formed on one of the portions and a corresponding notch 120 formed on the other portion to receive an edge thereof. It is also possible to form any of the viewing windows 117, 119 as a separate structure around which two or more portions of the shell 110 are fitted. However, since suitable transparent materials having low outgassing properties and low rates of shedding (e.g. loss of particles from the surface) are readily available, lowest cost is achieved by integral formation of the viewing windows in the shell portions 111, 111'. Examples of such suitable materials are PC (Polycarbonate, LEXAN®), PMMA (Poly(methylemethacrylate), BAYON®) and PETG (Poly(ethylene terepthalate—glycol modified), KODAR®). These materials are also particularly suitable since with additives (such as static dissipative agents) they can be somewhat conductive and thus dissipate static electricity.

It is contemplated that the item contained within the optical enclosure may be provided with bar code indicia such as a universal product code label for identification of the item contained in the isolation structure 100 to thus allow direct, automated identification thereof. Therefore, viewing windows must be maintained in good optical condition. To avoid scratching of the viewing windows and to maintain good optical properties thereof, the viewing windows are preferably either recessed slightly from the shell 110 exterior (as shown at viewing window 119) or a stacking structure is provided, preferably in the form of raised frame margins 121 and 122, or both. The raised margins 121 and 122 are preferably dimensioned to be functionally combined with a stacking structure, as indicated at 121 and 122 in FIG. 2. The windows are preferably formed symmetrically on major faces and edges of the shell 110 to avoid the need to reorient items to be inserted therein during automated insertion of items into the isolation structure 100.

The interior of shell 110 is preferably formed as symmetrically as possible in the vertical direction in order to accommodate an object placed therein in either of two orientations. This feature allows the avoidance of inversion of the object regardless of the orientation of the shell 110. This is particularly advantageous where it allows the provision of additional automated packaging machinery to be avoided to invert the objects. If stacking features such as raised frame margins 121, 122 are provided on the exterior of the shell 110, symmetry of the exterior of the shell 110 may not be possible. However, symmetry at the closure member opening (opening) 90 of the isolation structure 100 shell 110 is sufficient to obtain simplification of the object insertion process.

Shell 110 is also preferably formed with an external projection 115 which can be used to position the shell 110 during the insertion or removal of the contents thereof. The projection can also be used as a location for a process identification tag 116, preferably formed as an insert held between projections 115, or other identifying indicia. While no particular exterior dimensions or shapes are required for projection 115 or in combination with insert 116, it is considered preferable that the lateral ends 115' of projection 115 be angled, bevelled, rounded or otherwise shaped to facilitate gripping or handling of the shell 110 and separation of the shells 110 when stacked in accordance with stacking structures 121 and 122.

The closure member 112 in accordance with the invention is a composite structure; the principal constituent parts of which are a closure member body, preferably including a backbone 124, and a resilient pneumatic seal member 113. The backbone 124 supports the general shape of the resilient seal member 113 to generally conform to the shape of the closure member opening (opening) 90 in shell 110. The backbone 124 also preferably provides pneumatic manifolding 130 to communicate with the interior of the resilient seal member 113, as will be described in greater detail below. The edges if the backbone 124 are also preferably cup-shaped in cross-section, as best illustrated at 132 of FIG. 2 to form an elongated toroidal interior volume when resilient seal member 113 is installed thereon. Accordingly, apertures are provided in the cup-shaped edge of backbone 124 in accordance with the manifolding structure utilized. It is to be understood that while providing manifolding within the closure member body is preferred, it is only necessary to be able to communicate pressure or partial vacuum to the interior space defined, in part, by the resilient seal member 113 and a closable opening, tube or other arrangement could be provided directly on the resilient seal member 113, itself.

Figure 2:
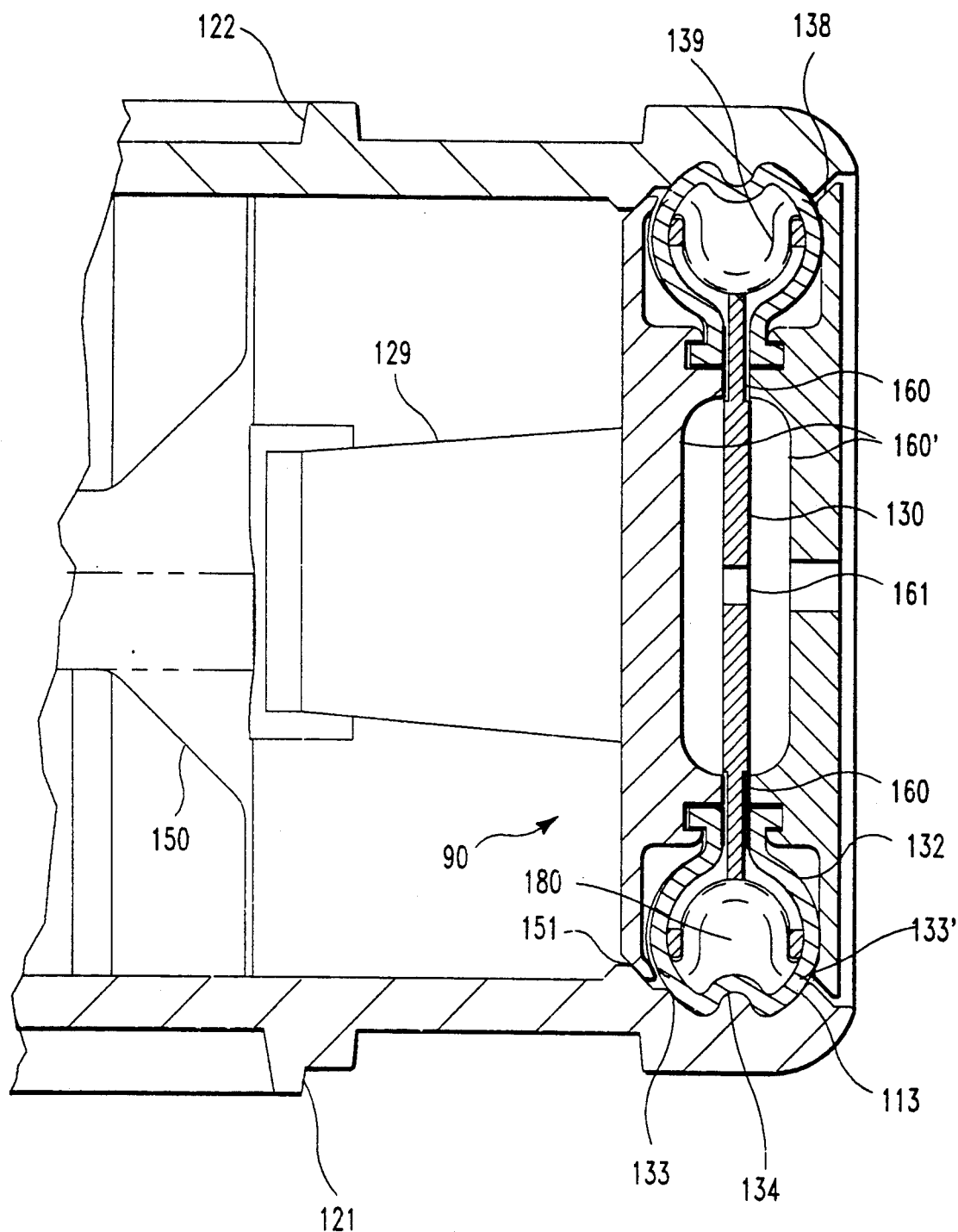
FIG. 2 is a cross sectional view of the closure member and seal member structure of the isolation structure illustrated in FIG. 1, and including a portion of the shell of the isolation structure.

With further reference to FIG. 2 as well as FIG. 1, to complete the major structure of the closure member 112, the closure member body preferably further includes front plate 123 and rear plate 125. As shown in FIG. 2, the front and rear plates clamp respective margins of resilient seal member 113 against outer sides of the cup-shaped edges 132 of the backbone 124. The front and rear plates 123, 125, in conjunction with the backbone 124, also mechanically constrain the resilient seal member 113 and provide controlled collapse of the seal member 113 when the interior volume is evacuated. The "interior volume" to be evacuated includes spaces 170 and 180 in hollow closure member 112 as well as the pneumatic manifolding 130. The space 170 is the space between the front plate 123 and the back plate 125. The space 180 is defined by the volume between the pneumatic seal member 113 and the cup-shaped edge of the closure member backbone 124. Of course, it is to be understood that this definition of the "interior volume" is directed to the particular shapes and topologies of the constituent parts of the preferred embodiment of the invention and basically includes all interior space of the closure member which is in communication with the interior 180 of the resilient seal member 113, thus constituting "manifolding" regardless of its configuration. It should also be understood that the "manifolding" may, in fact, occupy only a very minor fraction of the interior space which may exist in the closure member 112 (closure). It is considered, however, that increased volume of the manifolding may increase tamper resistance by requiring evacuation of a greater volume which is more likely to require specialized apparatus for successful collapsing of the resilient seal member 113.

Location of the front and rear plates 123, 125 relative to the backbone 124 is preferably facilitated by cylindrical housings 340 secured to the back of front plate 123 centered on center lines 126 and 126' respectively. Cylindrical housings 340 extend through holes in the backbone 124 and back plate 125, which holes are also aligned with center lines 126 and 126' respectively. On the back side of back plate 125, the retaining nuts 324 are pushed over the ends of cylindrical housings 340, so nuts 324 lock onto cylindrical housings 340 by turning them into a locked position as it well-understood by those skilled in the art.

Alternatively, the front and back plates 123, 125 and the backbone 124, together with other closure member structure can be joined together by pins extending from either or both of the front and back plates 123, 125 and/or backbone 124 and welded, bonded or otherwise affixed at the front and back plates 123, 125 to secure the closure member assembly together. Also, as beet shown in FIG. 2, the edges of the front and back plates 123, 125 are preferably shaped to closely engage the margins of the resilient seal member 113 which are preferably angled to give the resilient seal member 113 an overall appearance, in cross-section, of the Greek letter "Ω". This structural configuration provides a particularly gas-tight seal member 113 between these parts, allowing the seal member 113 to be pressurized and such pressure maintained for extended periods of time to 100.

Front plate 123 also has an aperture 131 cooperating with the manifolding provided by backbone 124 to allow the interior of the resilient seal member 113 to be pressurized or evacuated. At least the front surface of the front plate also preferably provides a flat surface for facilitating engagement by a vacuum closure member removal plate 114 which will be discussed below. The backbone 124 and front and back plates 123, 125 are preferably formed of the same material as the shell 110. However, transparency is not normally required, providing slightly greater latitude in choice of materials.

Manifolding 130 can be fabricated in many forms, such as with tubes or hollow structures within the backbone 124. However, an extremely simple preferred structure may be formed simply as grooves or recesses in the sides of the backbone 124 (indicated at 160) or the abutting faces of the front and/or rear plates 123, 125 (indicated at 160'). The manifolding is preferably formed on both sides of the backbone 124 with at least one communicating hole 161 through the web of the backbone 124. Corresponding holes are also formed at the locations of the grooves in the cup-shaped edges of the backbone 124. The grooves or recesses may be formed by embossing, casting or machining or other methods. If the manifolding is formed as grooves, the grooves need only be deep enough to prevent closure by the resilient seal member 113 being pressed into the grooves when the front and rear plates 123, 125 are attached. Thus the grooves serving as pneumatic manifolding 130, in cooperation with the abutting inner faces of the front and rear plates 123, 125 complete a manifold which can communicate a desired pressure or vacuum from opening 131 on a preferably smooth or flush outer surface of the front plate 123 to the interior of the resilient seal member 113. The pressure or partial vacuum in the interior of the resilient seal member 113 can be maintained by providing appropriate closure for opening 131.

Front and rear plates 123, 125 and backbone 124 also have apertures for receiving a filter or breather 126 to allow equalization of pressure between the interior and exterior of the shell 110 without the introduction of particulate contaminants. The shell 110 may also be purged with a gas such as an inert gas after sealing of the shell 110 by closure member 112 by means of breather 316. However, it is preferable to provide at least two such breathers or filters to allow a gas to be more readily circulated throughout the shell 110.

Rear plate 125 is also preferably provided with a hygroscopic body 128 and a vapor absorptive body 127 affixed thereto, referred to hereinafter as drains. These absorptive bodies and filter 316 are readily removable from the assembled closure member 112 prior to cleaning. New filters and drains are fitted to closure member 112 when the closure member 112 is to be reused.

Also, as best shown in FIG. 2, the closure member opening 90 of the shell 110 has the overall form of a groove between an interior shoulder 133 and a similar exterior shoulder 133' around the entire periphery thereof. These shoulders are of a dimension which does not reduce the outline of the closure member opening 90 beyond the cross-sectional dimensions of the interior of the shell 110. The groove also preferably is shaped to include a preload ridge 134 to enhance the sealing effect against resilient seal member 113.

Shell 110 may also be fitted with a liner 150 which may function as a guide or holder for items placed therein. This liner preferably has a tapered edge 151. Alternatively, such a tapered region could be formed integrally with shell 110 or shell portions 111, 111'. The rear plate 125 of door 112 is also preferably tapered to cooperate therewith to provide a smooth interior surface of the isolation structure 100.

A tapered edge 138 is also formed on the periphery of front plate 123 to cooperate with an outer portion of the profile of outer shoulder 133'. This tapered region provides a periphery of the front plate which is larger than the periphery of resilient seal member 113 when retracted by evacuation, as shown by dashed lines 137, to reduce the risk of damage thereto. Further, when the resilient seal member 113 is pressurized or otherwise allowed to resiliently expand, the seal member 113 exerts a camming action against the inner portion of the profile of outer groove shoulder 133' until the tapered edge of the front plate 123 is seated against the outer portion of the profile of shoulder 133'. At the same time, the tapered edge of the rear plate 123 is seated against the tapered region 151. This interfitting of surfaces provides a particularly secure positioning of the closure member 112 within the closure member opening 90 and, in particular, prevents the closure member 112 from being pushed inward to apply mechanical forces against items contained within the isolation structure 100. This seating of tapered structures also assures that the interior dimensions of the isolation structure 100 will not be altered by the seal member 113 or changes in the condition thereof.

Rear plate 125 is also preferably provided with a resilient buffer member 129, preferably including pad 332, and which is preferably dimensioned to apply a slight positioning force against an item placed in the isolation structure 100 when the closure member 112 is in place. Opposing positioning forces are applied to the item by resilient buffers 143, shown in FIG. 1. The opposing resilient pads thus provide substantial protection of the item against impacts applied to the isolation enclosure. Preferably the material chosen for these resilient buffers also provides a damping effect and thus provides protection against vibration being transmitted from the exterior of the isolation structure 100 to the contents thereof. Suitable materials include Fluoro (FLUORE®), Urethane (ELASTILAN®), Polyester (ELASTILAN®) or Buna-N.

In order to seal or open the isolation structure 100, a vacuum plate 114 is preferably used. In order to capture and manipulate the closure member 112, the vacuum plate 114 must include a raised resilient seal 135 (e.g. an O-ring or suction cup) which is preferably located to surround the location of aperture 131 in order to conveniently evacuate the resilient seal member 113 through manifolding 130 in the structure of backbone 124. It is especially preferable for raised resilient seal 135 to extend around the entire periphery of the vacuum plate 114. This location provides the optimum application of frictional engagement forces between the raised resilient seal 135 and the front plate 123 of the closure member 112 for manipulation thereof. However, if this location for the raised resilient seal 135, one or more further, similar seals must be provided to prevent vacuum from being applied to the interior of the isolation structure 100 through breather, which may preferably be an assembly of several elements indicated by center line 126. This is preferably done by providing O-ring seals 318 and 136 (shown in phantom in FIG. 1), as will be discussed in greater detail below.

Further, for opening of the isolation structure 100 after the outer surface thereof has been exposed to contamination, this location of the raised resilient seal 135 provides a sealed chamber to contain the contamination. Any contamination present cannot escape the chamber due to the vacuum applied. This feature considerably reduces the difficulty of maintaining clean processing conditions within processing apparatus. For example, the shell 110 of the isolation structure 100 need not be introduced into processing equipment but merely placed against an aperture in a cover thereof. A contaminated cover could be withdrawn and the contamination fully contained by automated mechanisms within the processing apparatus while the contents of the isolation structure 100 is removed. The cover could then be replaced and the contaminated isolation structure 100 removed and the processing apparatus cover resealed with little or no opportunity for contamination of the interior of the processing apparatus to occur.

Figure 3:
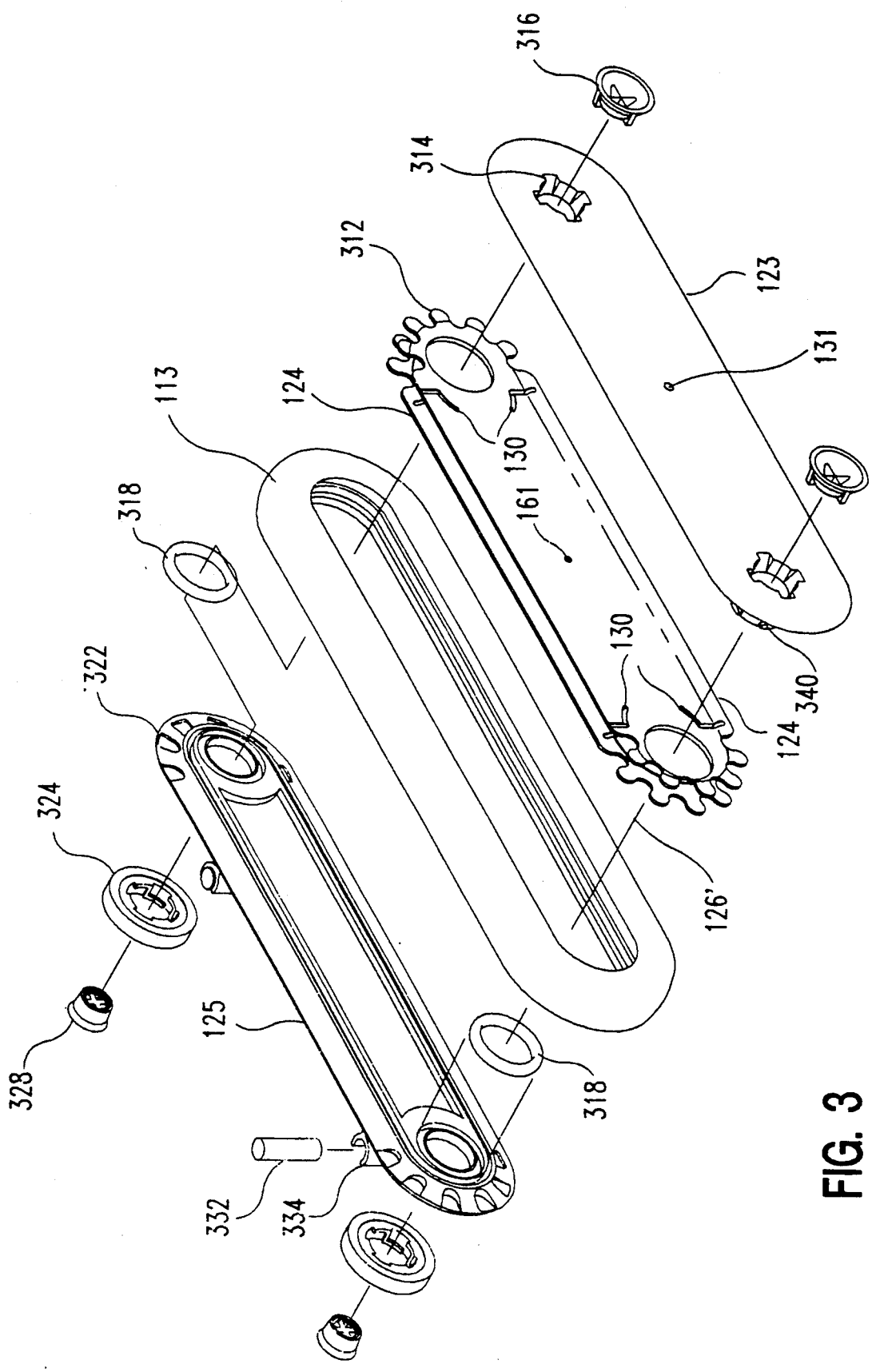
FIG. 3 is an exploded view of an alternative embodiment of the closure member structure in accordance with the invention showing some preferred features thereof.

Referring now to FIG. 3, a preferred structure for several of the constituent parts of closure member 112 will be described. A preferred form of backbone 124 includes a toothed periphery at the rounded ends thereof. These teeth, such as shown at 312, provide gaps which improve gripping and sealing of the margin of resilient seal member 113. It should be noted in this regard that a suitable resilient seal member 113 made of an elastomeric material is commercially available but is shaped in a generally circular rather than an elongated oval form. Straightening the curvature of this commercially available seal 318 along the linear portions of the backbone 124 stretches the inner periphery and does not affect the sealing action between the backbone 124 and the front and rear plates 123, 125. However, where the curvature is increased, the inner margin is compressed. Therefore, the teeth 312 are advantageous in accommodating the compressed material in these regions while gripping the resilient seal member against corresponding ribs 322 between recesses formed in the front and rear plates 123, 125. It is considered preferable that the ribs and teeth be opposed to each other rather than interleaved since the serpentine shape into which the seal margin would be forced, in the latter case, provides an inferior seal and concentrates forces during insertion of the closure member 112 into the shell 110 closure member opening 90 which could tear or otherwise degrade the resilient seal member 113.

A preferred structure for the resilient buffers 129 is formed by insertion of cylindrically shaped buffers 332 into brackets 334 which may be formed integrally with or attached to the rear surface of rear plate 125. Buffers 332 are preferably force fit into these brackets 334 so that the resilient material thereof will be retained therein and also deformed slightly to protrude in the direction of application of force to the contents of the isolation structure 100.

A preferred form of the breather 126 is also shown in FIG. 3 which also performs the function of locating pins 125' of FIG. 1. Breather body 316 which is generally cone-shaped is provided which preferably has protrusions thereon which key into notches 314 in apertures formed in front plate 123. The breather body thus reaches through all of the front plate 123, backbone 124 and rear plate 125. An O-ring seal 318 is provided around the breather body within apertures in the backbone 124. Thus when the breather body is placed in tension, preferably by the installation of a quarter-turn nut affixed thereto, the O-ring seal 318 is flattened and deformed against the interior of the aperture in the backbone 124 while maintaining a slight separation of the front and rear plates 123, 125 therefrom until the parts are fully seated against each other and in engagement with resilient seal member 113. In this fashion, the front and rear plates 123, 125 and the backbone 124 are made self-aligning during assembly. Filter elements 328 are then carried by the interior surfaces of the breather body 316.

The closure member 112 of the isolation structure 100 is preferably operated by capturing the closure member 112 with a vacuum plate 114 of the form discussed above after removing any closure of opening 131, if necessary. The application of a partial vacuum to the surface of the front plate 123 is also communicated through manifold 130 to the interior of resilient seal member 113 which then assumes the shape indicated at 137. The closure member 112 can then be easily seated or removed, as desired.

The ends of the cup-shaped edges of the backbone 124 are preferably dimensioned to provide a sliding fit over groove shoulder 133'. While some wear on the resilient seal will occur unless a clearance is provided, a sliding contact will provide the most secure closure and seal member 113 of the closure member 112. Any significant wear which occurs will be easily detectable by inspection. Further, a two-step, detent-like action will be provided by the ends of the cup-shaped edges of the backbone 124 which can be sensed by automated equipment to indicate proper closure of the closure member 112. The detent action will also hold the closure member 112 in a correct position relative to shell 110 while the resilient seal member 113 is allowed to expand or is pressurized.

It should be noted that when the closure member 112 is correctly seated, there are no grippable projections on either the surface or the edges of the closure member 112. The preferably bevelled or tapered edges of the closure member 112 are closely fitted to and slightly recessed below the edge of shell 110. The resiliency of the resilient seal member 113 at the edges of the backbone 124 and front and rear plates 123, 125 is preferably chosen such that it cannot be collapsed by evacuation which is less than the partial vacuum required to firmly grip the closure member 112 by vacuum plate 114. Thus, the isolation device is made highly resistant to tampering and cannot be opened without severe and visible damage to the shell 110 or closure member 112 of the isolation structure 100, or both.

Figure 5:
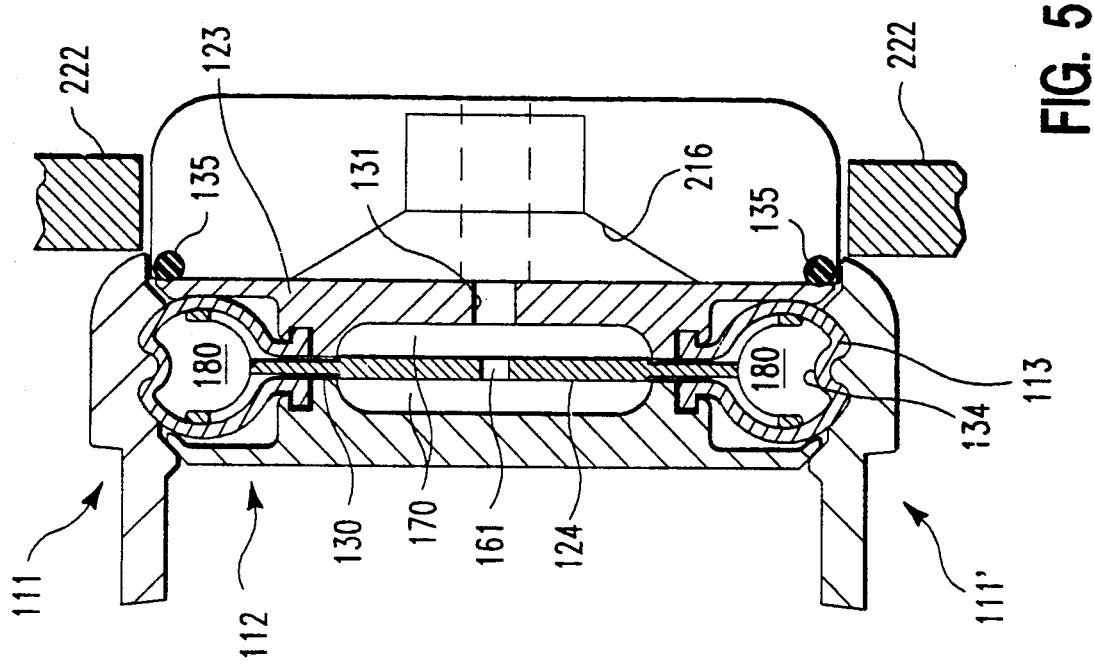
FIGS. 4 and 5 illustrate the process of unlatching the closure member of the isolation enclosure in accordance with the invention.
Figure 4:
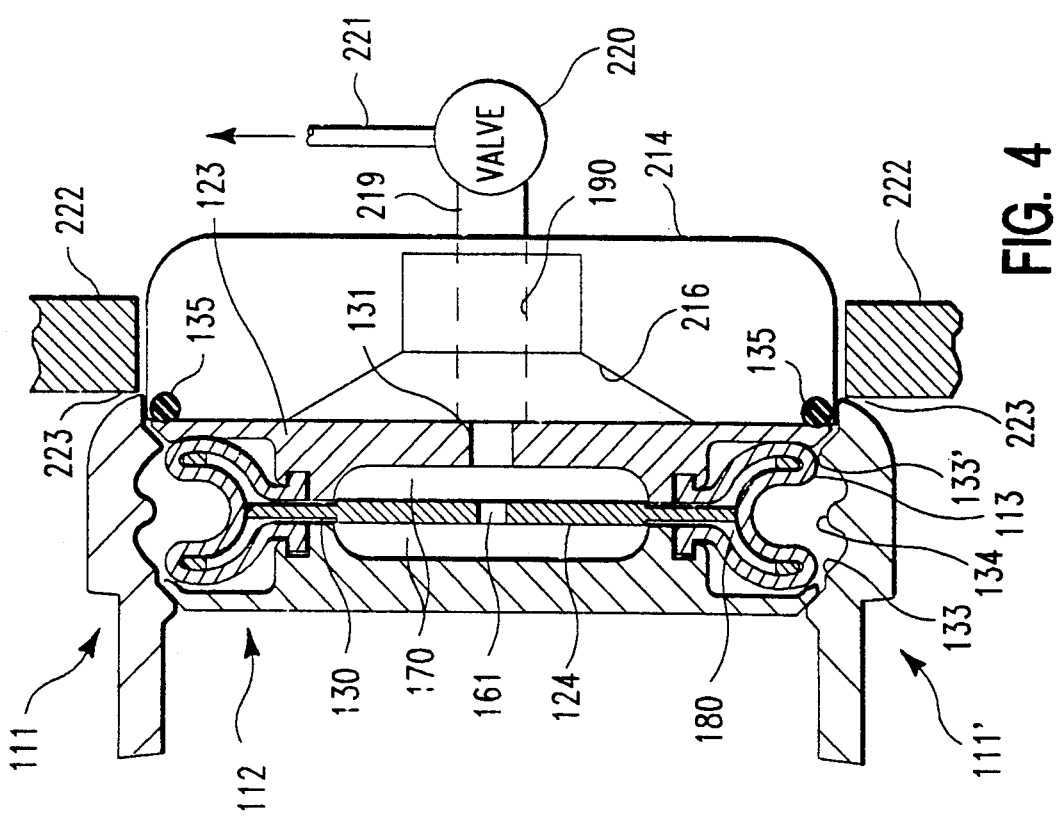

The preferred process of closing and opening of the isolation enclosure in accordance with the invention, together with a preferred form of vacuum closure member 112 removal plate structure 114, will now be described in detail with reference to FIGS. 4 and 5. Specifically, closure member removal plate 114 has a generally planar surface for mating with the closure member assembly 112 at the front plate 123 thereof, as shown in FIG. 1. This mating surface of closure member 112 preferably includes means for establishing a good seal against the closure member front plate 123, such as a raised resilient seal 135, regardless of minor warpage, scratches and the like existing on the outer surface of the closure member 112. The closure member removal plate 114 also preferably includes a vacuum line 190 and a recess 216 (in the hollow conical shape of a suction cup) of substantial volume which may be a separate structure within the closure member removal plate 114, preferably in the form of at least one suction cup. Vacuum line 190 is preferably located centrally of the suction cup shape 216 and concentrically with aperture 131 in front plate 123. Further, vacuum line 190 has a length which provides a small clearance (e.g. less than the radius of aperture 131 in order to provide preferential evacuation of manifolding 130 in the closure member 112 when a sufficient level of vacuum has been achieved for full gripping of the closure member assembly 112. This arrangement of evacuated volumes allows enhanced gripping of the closure member assembly 112 since any leakage at resilient seal 135 or suction cup 216 results in only a relatively slow lose of vacuum in view of the preferably relatively large total volume of the manifolding 130 and interior volume of the closure member 112 removal plate 114, including the volume within the seal 135 and within suction cup 216. Any such partial loss of vacuum will increase the clearance between vacuum line 190 and the front face of front plate 123 and thus tend to preferentially evacuate the suction cup 216 until full vacuum gripping is again established. It should be understood that in such an occurrence, after resilient seal member 113 has been collapsed as shown in FIG. 4, such a partial loss of vacuum will not immediately reseal the closure member 112 since return of pressure to the interior of resilient seal member 113 will be limited by the small cross-sectional area of the manifolding 130 at grooves 160.

Thus the vacuum gripping of the closure member 112 and the collapse of the seal member 113 will be stabilized even in the presence of minor leakage of the closure member removal plate 114, due to the baffle formed by the clearance between the vacuum line 190 and the front face of front plate 123. By virtue of the same structure, when gripping is initiated after positioning of closure member removal plate 114 against the closure member 112, the clearance between the closure member 112 and the end of vacuum line 190 will be somewhat greater than the final location and the suction cup 216 and the remainder of the volume within resilient seal 135 will be achieved before a vacuum is pulled on the manifolding 130 and, in turn, on the interior of resilient seal member 113 due to the restriction on gas flow at groove 160 of manifolding 130. Therefore, gripping of the closure member is assured prior to the collapsing of resilient seal member 113.

For gripping of the closure member 112, closure member removal plate 114 is placed against the outer surface of closure member 112 and a vacuum is applied to vacuum line 221 through a valve 220 and thence to the interior of the closure member removal plate 114 through vacuum line 190 which is preferably attached to valve 220 or vacuum line 221 through a threaded fitting 219. As indicated above, the clearance between the vacuum line 190 and the front of the closure member assembly 112 will cause a vacuum to first be drawn more strongly on the interior space defined by recess 216 of the closure member removal plate 114 and thereafter drawn more strongly through aperture 131 to space 170 which is connected to manifolding 120 to draw a vacuum on the manifolding 130. After vacuum gripping has been accomplished and as vacuum is drawn on manifolding 130, vacuum is drawn somewhat more slowly on the interior of resilient seal member 113 to collapse the same. Once the resilient seal member 113 is collapsed, the closure member removal plate 114 can be drawn back, preferably within a clean environment indicated by housing wall portions 222 to allow access to the interior or contents of the enclosure 110. In this connection, it may also be desirable to provide a seal or support for enclosure 111 where it abuts wall portions 222, as generally indicated at 223, to provide further protection against contamination.

After placement of an article within the shell 110 or removal therefrom, the closure member 112 may be replaced and resealed by merely releasing the vacuum and allowing resilient seal member 113 to expand to its original shape as installed on closure member assembly 112. The release of the vacuum is preferably regulated so that the resilient seal member 113 will resume its original shape and seal the enclosure more or less concurrently with the release of the closure member 112 by closure member 112 removal plate 114. In this regard, the clearance between vacuum line 190 and the front surface of closure member assembly 112 can be of assistance in regulating the timing of the closure member 112 release to the expansion of resilient seal member 113. In any event, the mechanical pressure on the closure member removal plate 114 against closure member assembly 112 maintains the closure member 112 seated against the shell 110 and timing of the release and the expansion of resilient seal member 113 is not particularly critical. Positive pressure in vacuum line 221 coupled to manifolding 130 through vacuum line 190 can also be advantageously used to speed expansion of resilient seal member 113 and, if desired, manifolding 130 can be pressurized and sealed to enhance the gripping of shell 110 by the resilient seal member 113.

In view of the foregoing, it is clear that a system of protection features has been provided in a single isolation structure 100 of simple design and which can be fabricated and used economically. Protection of the contents of the isolation structure 100 from impacts vibration, contamination from particulates and vapors and tampering are all provided while allowing inspection of the contents. Manipulation of the isolation structure 100 does not require specific modification of automated mechanisms since vacuum plates may be used to manipulate the structure and parts thereof. The isolation structure is reusable and can be easily cleaned between uses. The seal member 113 does not affect internal dimension of the isolation structure 100 and allows a smooth interior surface to be provided.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. An isolation structure including
   a shell having an interior adapted to accommodate a contamination sensitive item and having an opening leading to said interior and
   a closure member dimensioned to be received within said opening and completely removed therefrom, said closure member including
   a closure member body having an outer periphery and a resilient seal on said outer periphery of said closure member body, said resilient seal defining at least a portion of an interior space within said resilient seal and forming at least a portion of an outer surface of said closure member, said closure member body further including a backbone and front and rear plates for attaching said resilient seal to said backbone, said rear plate facing said shell interior when said closure member is received within said shell opening, and said front plate having at least one aperture formed therein, and
   means for communicating pneumatic pressure from said outer surface of said closure member to said interior space within said resilient seal and manifold means at least partially enclosed within said closure member body including said at least one aperture in said front plate.

2. An isolation structure as recited in claim 1, wherein a portion of said manifold means is formed by grooves located on a surface of said backbone.

3. An isolation structure as recited in claim 1, wherein said front plate provides a smooth outer surface of said closure member.

4. An isolation structure as recited in claim 3, further including means for locating at least one of said front plate and said back plate relative to said backbone.

5. An isolation structure as recited in claim 4, wherein said means for locating at least one of said front plate and said back plate relative to said backbone includes locating pins.

6. An isolation structure as recited in claim 4, wherein said means for locating at least one of said front plate and said back plate relative to said backbone includes an O-ring.

7. An isolation structure as recited in claim 6, wherein said means for locating at least one of said front plate and said back plate relative to said backbone further includes a breather body.

8. An isolation structure as recited in claim 1, further including a groove formed along an inner surface of said opening in said shell.

9. An isolation structure as recited in claim 8, wherein said groove further includes a preload ridge.

10. An isolation structure as recited in claim 1, wherein said shell is formed of at least two portions.

11. An isolation structure as recited in claim 10, wherein at least one said portion of said shell has at least one viewing window formed therein.

12. An isolation structure as recited in claim 1, wherein said shell has at least one viewing window formed therein.

13. A closure member for an isolation structure including
   a closure member body having an outer periphery and a resilient seal on said outer periphery of said closure member body, said resilient seal defining at least a portion of an interior space within said resilient seal and forming at least a portion of an outer surface of said closure member including a backbone and front and rear plates for attaching said resilient seal to said closure member body, said front plate having at least one aperture formed therein, and means for communicating pressure from said outer surface of said closure member to said interior space within said resilient seal comprising manifold means at least partially enclosed within said closure member body and wherein a portion of said manifold means is formed by grooves located on a surface of said backbone and said front plate, including said at least one aperture.

14. A closure member as recited in claim 13, wherein said front plate provides a smooth outer surface of said closure member.

15. A closure member as recited in claim 14, further including means for locating at least one of said front plate and said back plate relative to said backbone.

16. A closure member as recited in claim 15, wherein said means for locating at least one of said front plate and said back plate relative to said backbone includes locating pins.

17. A closure member as recited in claim 15, wherein said means for locating at least one of said front plate and said back plate relative to said backbone includes an O-ring.

18. A closure member as recited in claim 17, wherein said means for locating at least one of said front plate and said back plate relative to said backbone further includes a breather body.

19. A closure member as recited in claim 13, wherein said means for communicating pressure from said outer surface of said closure member to said interior space within said resilient seal comprises manifold means at least partially enclosed within said closure member body.

20. A closure member as recited in claim 15, wherein a portion of said manifold means is formed by grooves located on a surface of said backbone.

* * * * *